United States Patent
Jeol et al.

(10) Patent No.: US 9,902,809 B2
(45) Date of Patent: Feb. 27, 2018

(54) THERMOPLASTIC POLYIMIDES

(71) Applicant: RHODIA OPERATIONS, Aubersvilliers (FR)

(72) Inventors: Stephane Jeol, Lyons (FR); Vincent Mollet, Chalonsur-Saone (FR); Benjamin Paci, Woippy (FR)

(73) Assignee: RHODIA OPERATIONS, Aubersvilliers (FR)

( * ) Notice: Subject to any disclaimer, the term of this patent is extended or adjusted under 35 U.S.C. 154(b) by 264 days.

(21) Appl. No.: 14/346,093

(22) PCT Filed: Sep. 18, 2012

(86) PCT No.: PCT/EP2012/068364
§ 371 (c)(1),
(2) Date: Mar. 20, 2014

(87) PCT Pub. No.: WO2013/041528
PCT Pub. Date: Mar. 28, 2013

(65) Prior Publication Data
US 2014/0228513 A1 Aug. 14, 2014

(30) Foreign Application Priority Data

Sep. 20, 2011 (FR) .................................... 11 58321

(51) Int. Cl.
| | | |
|---|---|---|
| *C08G 73/10* | (2006.01) | |
| *C08L 79/08* | (2006.01) | |
| *C08K 7/06* | (2006.01) | |
| *C08K 3/00* | (2018.01) | |

(52) U.S. Cl.
CPC ......... *C08G 73/1028* (2013.01); *C08G 73/10* (2013.01); *C08G 73/101* (2013.01); *C08G 73/1007* (2013.01); *C08G 73/1075* (2013.01); *C08G 73/1082* (2013.01); *C08K 7/06* (2013.01); *C08L 79/08* (2013.01); *C08K 3/00* (2013.01); *Y10T 428/2982* (2015.01)

(58) Field of Classification Search
CPC ............................ C08G 73/10; C08G 73/1003; C08G 73/1007; C08G 73/1028; C08G 73/1075; C08G 73/1082; C08K 3/00
USPC .......................................................... 524/600
See application file for complete search history.

(56) References Cited

U.S. PATENT DOCUMENTS

| | | | | |
|---|---|---|---|---|
| 2,710,853 A | * | 6/1955 | Edwards ............ | C08G 73/1082 264/40.1 |
| 2,867,609 A | * | 1/1959 | Edwards ............ | C08G 73/1003 526/59 |
| 2,880,230 A | * | 3/1959 | Edwards ............ | C08G 73/1007 156/331.9 |
| 3,528,937 A | * | 9/1970 | Seddon .............. | C08G 73/1007 264/154 |
| 3,624,050 A | | 11/1971 | Strickrodt et al. | |
| 3,677,921 A | | 7/1972 | Stivers | |
| 3,700,649 A | * | 10/1972 | Moram et al. ..... | C08G 73/1067 427/385.5 |
| 3,833,546 A | | 9/1974 | Takekoshi et al. | |
| 4,603,193 A | * | 7/1986 | Richardson ............ | C08G 63/78 528/183 |
| 4,945,170 A | * | 7/1990 | Kohli ................... | C08G 73/121 548/521 |
| 5,093,202 A | | 3/1992 | Mariaggi et al. | |
| 6,133,407 A | * | 10/2000 | Kaneshiro .......... | C08G 73/1032 428/473.5 |
| 6,646,060 B1 | * | 11/2003 | Toyohara ........... | C08G 73/1082 360/3 |
| 2005/0215715 A1 | * | 9/2005 | Schmeckpeper ..... | B29C 43/003 525/191 |
| 2014/0342628 A1 | * | 11/2014 | Jeol .................... | C08G 73/1007 442/181 |
| 2014/0371390 A1 | * | 12/2014 | Jeol .................... | C08G 73/1075 524/606 |
| 2015/0045501 A1 | * | 2/2015 | Jeol .................... | C08G 73/1042 524/600 |

OTHER PUBLICATIONS

Inoue, Tatsuo, et al—"High-Pressure Synthesis and Properties of Aliphatic-Aromatic Polyimides via Nylon-Salt-Type Monomers Derived from Aliphatic Diamines with Pyromellitic Acid and Biphenyltetracarboxylic Acid", 1997, Macromolecules, vol. 30, Issue No. 7, American Chemical Society, pp. 1921-1928; 8 pgs.
Koning, C., et al—"Influence of polymerization conditions on melt crystallization of partially aliphatic polyimides", 1998, Polymer, vol. 39, Issue No. 16, Elsevier, pp. 3697-3702; 6 pgs.

* cited by examiner

*Primary Examiner* — Jane L Stanley
(74) *Attorney, Agent, or Firm* — Thi Dang

(57) ABSTRACT

The present invention relates to thermoplastic polyimides and to the synthesis thereof. The invention relates in particular to a method for manufacturing semi-aromatic thermoplastic polyimides by means of the solid-state polymerization of a solid ammonium carboxylate salt formed from an aliphatic diamine and an aromatic tetracarboxylic acid, thereby enabling powders having controlled particle sizes to be produced.

22 Claims, No Drawings

THERMOPLASTIC POLYIMIDES

This application is a U.S. national stage entry under 35 U.S.C. § 371 of International Application No. PCT/EP/2012/068364, filed Sep. 18, 2012, which claims priority to FR 1158321, filed Sep. 20, 2011. The whole content of each of these applications is hereby incorporated herein by reference for all purposes.

The present invention relates to thermoplastic polyimides and to their synthesis. The invention relates in particular to a process for producing semiaromatic thermoplastic polyimides by solid-state polymerization of a solid ammonium carboxylate salt formed from an aliphatic diamine and an aromatic tetracarboxylic acid, which can be used to produce powders with controlled particle size.

PRIOR ART

Aromatic polyimides (PI) are polymers which have noteworthy thermal and mechanical properties that rightly predestine them for high-performance applications in a variety of sectors, especially aeronautics. Nevertheless, these aromatic polyimides are considered to be thermosetting and infusible and to require the use of synthesis processes in solution in solvents which are toxic, especially carcinogenic or potentially carcinogenic in some cases, and/or inimical to the environment, from aromatic diamines and aromatic dianhydrides. The best-known and most widespread process for synthesizing polyimides is a two-step process which involves a first step of reacting an aromatic dianhydride, in a solvent such as dimethylacetamide, cresols or else N-methylpyrrolidone, with an aromatic diamine, to form a so-called polyamic acid intermediate, which is subsequently converted to polyimide in a second step, by an increase in the temperature or by chemical dehydration.

During the first step, the amines open the anhydride rings and give rise to an acid amide—often called amic acid—function. The polyamic acid formed is soluble in the synthesis solvent and is converted by cyclization to polyimide, which is usually insoluble. To make a polyimide film, for example, a solution of polyamic acid is poured onto a heating surface. When the heating surface is heated, the solvent evaporates and cyclization takes place: the product is a polyimide film.

It is clearly apparent that the very high performance levels of aromatic polyimides require the use of monomers which are carcinogenic, such as the aromatic diamines, and require synthesis processes and shaping processes that are complex and/or less respective of the environment, requiring in particular the use of toxic and/or carcinogenic solvents. Moreover, these aromatic polyimides are often considered to be thermosetting polymers on account of their infusible nature.

In order to render the aromatic polyimides fusible, and therefore amenable to conversion by techniques of extrusion or injection molding, in particular, it is known practice to use relatively flexible aromatic diamines, which give rise to amorphous polyimides with a glass transition temperature Tg of close to 200° C., which are known by the polyetherimide name, with Ultem being one commercial name. Processes which have been developed involve performing the polymerization in the melt state of between 275 and 290° C., as in U.S. Pat. No. 3,833,546, from a direct mixture of aromatic dianhydride and aromatic diamine or of aromatic tetracarboxylic acid and aromatic diamine. In this case, the control of the reactants' stochiometry is not ideal, and rapid degradation reactions take place. The first drawback, yet again, is the use of aromatic diamines. The second drawback is that when the service temperature is greater than the Tg of the polyimide, the polyimide loses its mechanical strength, owing to its amorphous nature. Lastly, as an amorphous polymer, the mechanical properties are dependent primarily on the molar mass, which must be greater than the molar mass between entanglements: for these polymers, this implies possession of not inconsiderable molar masses, and this is accompanied by a high viscosity in the melt state. These flexible aromatic polyimides are, in spite of this, considered to be thermoplastics.

Semiaromatic polyimides represent an interesting approach to the problems posed, since they can be semicrystalline and can have melting temperatures which are compatible with the conversion temperatures of thermoplastics, a melting temperature of generally less than 330° C., and can therefore be converted by the processing processes that are known for thermoplastics, similar to polyamides, while enjoying an excellent temperature stability.

There are a variety of synthesis methods, starting with synthesis in solution as described for aromatic polyimides. One example of polyimide synthesis in solution is described by Cor Koning in the journal Polymer 1998, volume 39, 16, pages 3697-3702. The authors synthesize polyimides in solution from 3,3'-4,4'-biphenyltetracarboxylic dianhydride and from aliphatic diamines containing between 4 and 10 methylene groups. The polyimides obtained possess melting temperatures of less than 330° C. Melt-state polymerizations are described by U.S. Pat. No. 2,710,853 or U.S. Pat. No. 2,867,609, from aliphatic diamine and pyromellitic anhydride, or from difunctional acid diester derivatives of pyromellitic anhydride, in accordance with known processes for polyamide synthesis. The major drawback of this technique is that it requires the selection of a synthesis temperature which is greater than the melting temperature of the polyimide formed over long durations, thereby giving rise to substantial and significant thermal degradation.

In order to eliminate this problem, a Japanese team (Inoue et al in Macromolecules 1997, 30, 1921-1928 "High Pressure Synthesis of Aliphatic-Aromatic Polyimides via Nylon-Salt-Type Monomers derived from aliphatic diamines and pyromellitic acid and biphenyltetracarboxylic acid") identified a method for polymerizing aromatic tetracarboxylic acid salt and aliphatic diamines in the solid state. The authors thus prepare a salt which is pressed at pressures of several hundred bar, to give objects such as disks, and subsequently heat the resulting disks to a given temperature under various pressures. In the course of the heating, the reaction takes place, and generates water, which shows that the reaction has taken place, and would take place very rapidly. On the other hand, these resulting objects are unhandlable and unusable as they are.

The problem with the processes envisaged by these authors lies in the fact that it is necessary to extract the water of reaction formed in the course of shaping, and this may give rise to defects in the moldings, with long conversion times giving rise to excessive conversion costs and/or possibly producing moldings of suboptimum quality, with problems of porosity and surface appearance, or else requiring adaptation and/or changing of equipment intended for the use of nonreactive polymers.

Moreover, the existing processes may prove unsatisfactory in terms of controlling the molar mass and/or the viscosity of the polyimide. This, however, is particularly important, if only in relation to the type of shaping envisaged.

It was therefore necessary to develop a process for preparing such semiaromatic polyimides that allows some or all of these drawbacks to be alleviated.

Furthermore, applications exist for which the polymers are required to be in the form of powders. This is the case, in particular, with laser sintering or with processes for manufacture of continuous fiber composites from powders by dusting of fabrics or pultrusion of carbon or glass monofilament, or else other processes. The known technologies for producing polymer powders require either dissolving a polymer in a solvent and precipitating from a nonsolvent—but this involves the use of toxic and carcinogenic solvents—or mixing the polymer in the melt state with an immiscible species, so as to generate segregation of the desired polymer, or else milling granules of formulated polymers, which imposes additional steps of micronization and drying. Whatever the case cited, the processes are complex and expensive.

Moreover, the polyimides obtained by the prior-art processes, especially by the solid and/or diester route, may have an unsatisfactory relative viscosity and/or an unsatisfactory molar mass, and/or may have a variation in their relative viscosity and/or in the molar mass before and after melting thereof.

The present invention is therefore also aimed at producing polyimides which allow some or all of the problems set out above to be solved.

INVENTION

It has now been demonstrated by the applicant that it is possible for a powder of semiaromatic polyimides to be prepared, industrially and efficiently, for a variety of applications. This is made possible through the use of a solid-state polymerization of a solid ammonium carboxylate salt formed from an aliphatic diamine and an aromatic tetracarboxylic acid. The resulting polyimides are semicrystalline thermoplastics with the property of not releasing or absorbing water during subsequent steps of conversion such as, for example, pultrusion, extrusion, or injection molding. The process of the invention produces powders of controlled particle size, since the polymerization reaction takes place in the solid state.

These powders may be used in particular for producing composite articles, for producing articles by laser sintering, for coating, or in the cosmetic sector.

Furthermore, the solid-state polymerization avoids the use of carcinogenic or environmentally detrimental solvents.

Another advantage of the process of the invention is the capacity to carry out polymerization at a relatively low temperature, preventing thermal degradation of the salt and of the polyimide formed.

The present invention accordingly relates to a process for producing solid particles of semicrystalline and semiaromatic (co)polyimide (I), having a median diameter D50 of between 0.01 and 2 mm, said (co)polyimide being thermoplastic and having a melting temperature of between 50 and 350° C., which comprises at least the following steps:
(a) a reactor is charged with a salt formed by reaction of at least one aliphatic diamine with at least one aromatic tetracarboxylic acid;
(b) the salt from step (a) is subjected to polymerization in the solid state to give the (co)polyimide (I), at an absolute pressure of between 0.005 and 1 MPa and at a temperature T which obeys the following relation:

Tf of the salt from step (a)>T>Tg of the (co)polyimide (I) to be obtained;

(c) the solid (co)polyimide (I) particles are recovered.

The term "ammonium carboxylate salt" or "salt formed by reaction of at least one aliphatic diamine with at least one aromatic tetracarboxylic acid" refers, in the sense of the present invention, to a salt in which the diamine entities and tetracarboxylic acid entities are linked solely by polar interactions, more particularly of the —COO⁻H₃⁺N— type, and not by covalent bonding. More particularly, the salt comprises a tetracarboxylic acid and a diamine, which are not linked by covalent bonding. In particular, the salt may have the following structure, with Ar representing an aromatic group:

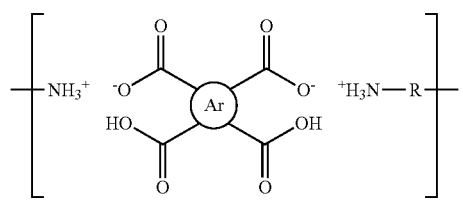

The invention also relates to solid particles of (co)polyimide (I), obtainable by the process as described above.

The present invention further relates to solid particles of semicrystalline and semiaromatic (co)polyimide (I), having a median diameter D50 of between 0.01 and 2 mm, said polyimide being thermoplastic and having a melting temperature of between 50 and 350° C., said (co)polyimide being obtained from a salt formed by reacting at least one aliphatic diamine with at least one aromatic tetracarboxylic acid.

Lastly, the invention relates to a (co)polyimide obtainable, and more particularly obtainable directly, by the process of the invention. Said (co)polyimide may have a stable relative viscosity. More particularly, after 40 minutes at a temperature equal to Tf+15° C., this being a temperature greater by 15° C. than the melting temperature of the (co)polyimide, the (co)polyimide may exhibit a change in its relative viscosity of less than or equal to 10%. This can be measured in the manner described in the examples.

Very particularly, the (co)polyimide obtained is white, and in particular it has a colorimetric characteristic CIE b*≤10.

The (co)polyimide may have a substantially stable relative viscosity and/or number-average molar mass, more particularly as compared before and after melting of the (co)polyimide, more particularly after 10 minutes in the melt state, more particularly still after 20 minutes in the melt state, or even after 40 minutes in the melt state. The term "substantially stable" refers to a change of less than or equal to 10%.

Definitions

The term "semicrystalline" refers to a polyimide having an amorphous phase and a crystalline phase, for example having a degree of crystallinity of between 1% and 85%. The (co)polyimides of the present invention preferably have a glass transition temperature Tg of less than or equal to 200° C., more preferably less than 150° C.

The term "thermoplastic polyimide" means a polyimide having a temperature above which the material softens and melts, and below which it becomes hard.

Median diameter D50 is understood to mean the median which separates the curve of particle size distribution by volume into two parts of equal areas. The particle size analyses can be carried out using a Mastersizer X laser diffraction particle sizer having an extensive optical bench from Malvern Instruments S.A., making it possible to characterize particle sizes of between 2 and 2000 µm. As the distribution is by volume, the median diameter will correspond to 50% of the total volume of the particles. Furthermore, the given median diameter corresponds to the diameter of an equivalent sphere, it being assumed that all the objects have a shape equivalent to a sphere.

The melting temperature of the salt is preferably determined by measuring the endothermic endpoint temperature as measured by differential scanning calorimetry (DSC), using a Perkin Elmer Pyris 1 instrument, by heating the salt starting from 20° C. at a rate of 10° C./min.

The melting temperature of the (co)polyimide is preferably determined at the peak of the fusion endotherm as measured by differential scanning calorimetry (DSC), using a Perkin Elmer Pyris 1 instrument, by heating the (co)polyimide starting from 20° C. at a rate of 10° C./min.

Particles are understood to mean, according to the present invention, objects which can take various shapes, such as spherical, substantially spherical, quasi-spherical, polyhedral, ovoid and/or ellipsoidal shapes, and which can exhibit, at the surface, bumps or small cavities forming irregularities, generated by gas bubbles, for example. The particles may be microballs, beads, aggregates, granules, agglomerates, pellets, powder, or others.

The present invention relates to the synthesis of (co)polyimides (I) from one or more aromatic tetracarboxylic acids and one or more aliphatic diamines. The polymers obtained from a single diamine and a single tetracarboxylic acid are polyimides, and are generally called homopolyimides. Reaction of at least 3 different monomers produces a copolyimide; more particularly two diamines and one tetracarboxylic acid, or one diamine and two tetracarboxylic acids. (Co)polyimides may be defined by the molar composition of each constituent monomer.

Monomers

The aromatic tetracarboxylic acids of the invention preferably have the carboxylic acid functions in positions such that they enable, generally, the formation of two acid anhydride functions on a single molecule by a dehydration reaction. The tetracarboxylic acids of the present invention generally have two pairs of carboxylic acid functions, each function pair being bonded to an adjacent carbon atom, at α and β. The tetracarboxylic acid functions may be obtained from acid dianhydrides by hydrolysis of the anhydride functions. Examples of acid dianhydrides and of tetracarboxylic acids, derived from dianhydrides, are described in U.S. Pat. No. 7,932,012.

The aromatic tetracarboxylic acids of the invention may also carry functional groups, such as, in particular, for example, the group —$SO_3X$, where X is H or a cation, such as Na, Li, Zn, Ag, Ca, Al, K, and Mg.

Preference is given in particular to aromatic tetracarboxylic acids which are selected from the group comprising the following: pyromellitic acid, 3,3',4,4'-biphenyltetracarboxylic acid, 2,3,3',4'-biphenyltetracarboxylic acid, 2,2',3,3'-biphenyltetracarboxylic acid, 3,3',4,4'-benzophenonetetracarboxylic acid, 2,2',3,3'-benzophenonetetracarboxylic acid, 1,2,5,6-naphthalenetetracarboxylic acid, 2,3,6,7-naphthalenetetracarboxylic acid, 2,3,5,6-pyridinetetracarboxylic acid, 3,4,9,10-perylenetetracarboxylic acid, 3,3',4,4'-tetraphenylsilanetetracarboxylic acid, and 2,2'-bis(3,4-bicarboxyphenyl) hexafluoropropanetetracarboxylic acid.

The aliphatic diamines of the invention may be described as molecules of formula $H_2N—R—NH_2$ with a divalent alkylaromatic or cycloaliphatic, or linear or branched, saturated and/or unsaturated aliphatic hydrocarbon radical R, optionally comprising one or more heteroatoms.

The radical R generally comprises from 2 to 50 carbon atoms, preferably from 6 to 36 carbon atoms. The radical R may optionally contain one or more heteroatoms, such as O, N, P, or S. The radical R may comprise one or more functional groups, such as hydroxyl, sulfone, ketone, ether, or other functions.

An "aliphatic diamine" for the purposes of the present invention is a compound in which the amine functions are each carried by an aliphatic carbon, more particularly by an $sp^3$ carbon. Most particularly, the amine functions are primary amines. The diamines of the invention are said to be aliphatic insofar as the amine functions are not bonded covalently to a carbon atom of an aromatic group, such as a phenyl, for example. Accordingly, the aliphatic diamines may comprise:

a saturated aliphatic group R, an unsaturated aliphatic group R; more particularly the amine functions are each carried by an alkylaromatic; in this case, the amine functions are not carried by a carbon of the aromatic group, and more particularly the amine functions are each carried by tetragonal or $sp^a$ carbons.

The diamines may in particular be diamines in positions a and w, containing from 15 to 20 methylene groups. The diamines of the invention preferably carry two primary amine functions.

The aliphatic diamines may be selected, for example, from the group comprising the following: 1,2-diaminoethane, 1,3-diaminopropane, 1,4-diaminobutane, 1,5-diaminopentane, 2-methyl-1,5-diaminopentane, hexamethylenediamine, 3-methylhexamethylenediamine, 2,5-dimethylhexamethylenediamine, 2,2,4- and 2,4,4-trimethylhexamethylenediamine, 1,7-diaminoheptane, 1,8-diaminooctane, 2,2,7,7-tetramethyloctamethylenediamine, 1,9-diaminononane, 5-methyl-1,9-diaminononane, 1,10-diaminodecane, 1,11-diaminoundecane, 1,12-diaminododecane, 1,13-diaminotridecane, and 1,14-diaminotetradecane.

The cycloaliphatic diamines are selected, for example, from the group comprising isophoronediamine, 1,3-diaminocyclohexane, 1,4-diaminocyclohexane, and diaminodicyclohexylmethane.

The alkylaromatic diamines are, for example, of formula $H_2N—(CH_2)n-Ph-(CH_2)n'—NH_2$ where n and n' are non-zero integral numbers which are independent of one another and advantageously between 1 and 4, and Ph is a phenyl group. Examples include meta-xylylenediamine and para-xylylenediamine.

Mention may be made of examples of diamines containing heteroatoms, such as polyether diamines, as for instance the Jeffamine® and Elastamine® products sold by Huntsman. A variety of polyethers exist, composed of ethylene oxide, propylene oxide or tetramethylene oxide units.

Step (a)

During step (a) of the process, accordingly, a reactor is charged with a salt formed by reaction of at least one aliphatic diamine with at least one tetracarboxylic acid. Very particularly, the aliphatic diamine and the tetracarboxylic acid are solely present in salt form.

Such a salt may be synthesized in various ways known to those skilled in the art.

One possible procedure, for example, is to add an aliphatic diamine to a solution comprising the tetracarboxylic acid. Another possibility is to dissolve the tetracarboxylic acid in a solvent such as alcohol, as for example ethanol or methanol, and to do likewise for the aliphatic diamine. These two solutions are then mixed together with stirring. The ammonium carboxylate salt formed may be insoluble in the solvent used and thus precipitate out. The salt may then be recovered by filtration, washed and dried, and optionally ground.

It is also possible to make a solution of the ammonium carboxylate salt and then to concentrate it while hot and then cool it. The salt then crystallizes and the crystals are recovered and dried. The solution may be concentrated by evaporating the solvent, such as the water or alcohol, or by another method, by addition of tetracarboxylic acid and/or aliphatic diamine. It is also possible to perform saturation of the solution, i.e. to perform a process for modifying the concentration of the salt in the solution to a value that is compatible with its crystallization. Generally, this concentration is at least equal to and more preferentially greater than the saturation concentration of the salt at the temperature under consideration. More precisely, this concentration corresponds to supersaturation of the salt solution. It is also possible to work at a pressure that enables the solvent of the solution, such as the water or alcohol, to evaporate off, so as to saturate the solution and bring about crystallization. A further possibility is to saturate the solution by successive or simultaneous addition of a stream of tetracarboxylic acid and a stream of diamine to a salt solution.

As an example, the tetracarboxylic acid is dissolved in the alcohol, such as ethanol, for example, in a first medium. The aliphatic diamine is dissolved in the alcohol in another medium, and the two media are then mixed with stirring. The salt obtained precipitates out.

At the end of this synthesis, the salt may be in the form of a dry powder, in the form of a powder dispersed in a solvent, or dissolved in solution. The salt may be recovered by filtration in the case of a precipitate, and the filter cake may be disintegrated, if necessary. When the salt is dissolved in solution, it may be recovered via a crystallization process by concentration or supersaturation or by making it precipitate out by addition of a non-solvent. The crystallized salt may then be recovered by filtration and the filter cake may be disintegrated, if necessary. Another process for recovering the dispersed particles of dry salt is spraying of the solution, i.e. in particular an operation of sudden evaporation of the solvent sprayed in the form of fine droplets so as to recover the dispersed salt particles.

Finally, it is possible to screen the salt particle size, for example by sifting or milling.

Step (b)

In step (b) of the process, accordingly, a solid-state polymerization is carried out, starting from the salt from step (a), to give the (co)polyimide (I), at an absolute pressure of between 0.005 and 1 MPa and at a temperature T which obeys the relation as described earlier. "Solid-state polymerization" refers, for the purposes of the present invention, to a polymerization which is not carried out in solution or in suspension in a solvent, nor in the melt state. In particular, the polymerization does not involve the addition of solvent to the powder(s) placed in the reactor.

The absolute pressure during step (b) is preferably between 0.005 MPa and 0.2 MPa.

The temperature during step (b) is preferably between 50° C. and 250° C.

The process of solid-state polymerization may be carried out according to the conventional processes known to those skilled in the art. The fundamental principle of these processes is to bring the initial salt, under air in an inert atmosphere or under vacuum, to a temperature which is lower than its melting point but sufficient to allow the polymerization reaction, generally a temperature greater than the glass transition temperature of the (co)polyimide. Such a polymerization process may thus comprise, in brief:

a) heating of the product by conductive or convective diffusion or by radiation, b) inertizing by application of vacuum, flushing with a neutral gas such as nitrogen, $CO_2$, or superheated steam, or application of a positive pressure, c) removal of the condensation by-product by evaporation, then flushing with the carrier gas or concentration of the gas phase, d) mechanical stirring or fluidization of the solid phase with the carrier gas or vibration may be desirable in order to improve the heat and mass transfers and also to prevent any risk of agglomeration of the divided solid.

It is preferred in step b) to use a means for keeping the (co)polyimide salt particles in motion, in order to prevent aggregation of these particles. This may also be accomplished by mechanical stirring, such as by use of a stirrer, by rotation of the reactor, or by vibratory agitation, or by fluidization with a carrier gas.

The number-average molar mass Mn of the polyimides may be between 500 g/mol to 50 000 g/mol.

Control of the number-average molar mass may be obtained:

through the use of chain transfer agents, these being molecules selected from monoamines, monoanhydrides, monofunctional acids or difunctional acids in α, β positions such that they are able to form an anhydride function by dehydration reaction; chain transfer agents include phthalic anhydride, 1,2-benzenedicarboxylic acid (or ortho-phthalic acid), acetic acid, propionic acid, benzoic acid, stearic acid, benzylamine, 1-aminopentane, 1-aminohexane, 1-aminoheptane, 1-aminooctane, 1-aminononane, 1-aminodecane, 1-aminoundecane, and 1-aminododecane, benzylamine, and mixtures thereof.

via a stoichiometric imbalance r=[tetracarboxylic acid]/[diamine]

through the use of branching agents, these being molecules with a functionality of more than 3 by adjustment of the operating conditions of syntheses, such as the residence time, the temperature, the humidity, or the pressure, or by a combination of these various means.

In particular, the stoichiometric imbalance r may range from 1.01 to 1.2. In other words, the imbalance is linked, more particularly, to an excess of acid.

According to one particular embodiment, the salt is:

admixed with chain transfer agents and/or admixed with an excess of one of the monomers, more particularly tetracarboxylic acid, so as to create a stoichiometric imbalance, in other words such that r is other than 1.

According to a variant, the chain transfer agent and/or the stoichiometric excess is added to the salt of step (a) already formed.

According to another variant, the chain transfer agent and/or the stoichiometric excess of one of the monomers is also in the form of a salt; more particularly, it forms a salt with the aliphatic diamine and/or with the tetracarboxylic acid. It may thus be a salt having a stoichiometric imbalance and/or a co-salt or mixed salt of aliphatic diamine, of tetracarboxylic acid and of chain transfer agent. Most particularly, the chain transfer agent and/or the stoichiometric excess is present during the formation of the salt of step (a)

and is added at the same time as the species corresponding thereto, for example the transfer agent of acid type is in a mixture with the tetracarboxylic acid and the transfer agent of amine type is in a mixture with the aliphatic diamine.

In this second case, the chain transfer agent allows the formation of salt, and may be chosen especially from the above lists, with the exception of the anhydrides.

The amount of chain transfer agent may be from 0.1% to 10% as a number of moles, especially from 1% to 5% as a number of moles, relative to the total number of moles of monomers, namely tetracarboxylic acid, diamine, and chain transfer agent.

When a chain transfer agent is used, the amounts of amines and of acids may be equilibrated, i.e., the sum of the amine functions is substantially equal to half the sum of acid functions with which they may react. The term "substantially equal" means a maximum difference of 1%.

When a chain transfer agent is used, the amounts of amines and of acids may be imbalanced, i.e., the sum of the amine functions is substantially different from half the sum of acid functions with which they may react. The term "substantially different" means a difference of at least 1%.

The invention thus further provides a salt of tetracarboxylic acid and diamine:
which likewise includes a chain transfer agent and/or
which exhibits a stoichiometric imbalance,
and also to the use of such a salt for forming a (co)polyimide and to a process for preparing (co)polyimide using such a salt.

Control of the stoichiometry may be performed at any point in the manufacturing process.

Use may be made of catalysts, added at any point during the process, for instance as a mixture with the diamine and/or the tetracarboxylic acid, as a mixture with the salt formed, either in solution or by impregnation in the solid state.

Step (c)

This step may allow the desired particles to be obtained without any need for additional mechanical grinding. On the other hand, it may be useful to carry out deaggregation of particles which may be agglomerated.

Compositions

The (co)polyimide of the invention may be used to make compositions that are generally obtained by mixing of the various compounds, fillers and/or additives. The process is performed at more or less high temperature and at more or less high shear force, according to the nature of the various compounds. The compounds can be introduced simultaneously or successively. Use is generally made of an extrusion device in which the material is heated, then melted and subjected to a shear force, and conveyed. According to particular embodiments, it is possible to prepare preblends, optionally in the melt, before preparation of the final composition. It is possible, for example, to prepare a preblend in a resin, of the (co)polyimide, for example, so as to produce a masterbatch.

The invention accordingly likewise relates to a process for producing a composition by melt or nonmelt mixing of solid particles of (co)polyimide (I) with reinforcing or bulking fillers and/or with impact modifiers and/or with additives.

The composition of the invention may optionally comprise one or more other polymers.

The composition of the invention may comprise between 20% and 90% by weight, preferably between 20% and 70% by weight, and more preferably between 35% and 65% by weight of (co)polyimide of the invention obtained by the polymerization process as described above, relative to the total weight of the composition.

The composition can additionally comprise reinforcing or bulking fillers. Reinforcing or bulking fillers are fillers conventionally used for the production of thermoplastic compositions, especially based on polyamide. Mention may in particular be made of reinforcing fibrous fillers, such as glass fibers, carbon fibers or organic fibers, non-fibrous fillers such as particulate or lamellar fillers and/or exfoliable or non-exfoliable nanofillers, for instance alumina, carbon black, clays, zirconium phosphate, kaolin, calcium carbonate, copper, diatomaceous earths, graphite, mica, silica, titanium dioxide, zeolites, talc, wollastonite, polymeric fillers, such as, for example, dimethacrylate particles, glass beads or glass powder. Preferably, in particular, reinforcing fibers, such as glass fibers, are used.

The composition according to the invention can comprise between 5% and 60% by weight of reinforcing or bulking fillers and preferentially between 10% and 40% by weight, relative to the total weight of the composition.

The composition of the invention comprising the (co) polyimide as defined above may comprise at least one impact modifier, this being a compound capable of modifying the impact strength of a (co)polyimide composition. These impact modifier compounds preferably comprise functional groups that are reactive with the (co)polyimide. According to the invention, functional groups that are reactive with the (co)polyimide are understood to be groups that are capable of reacting or interacting chemically with the residual anhydride, acid, or amine functions of the (co) polyimide, in particular by covalency, ionic or hydrogen-bond interaction, or van der Waals bonding. Reactive groups of these kinds ensure effective dispersing of the impact modifiers in the (co)polyimide matrix. Examples include anhydride, epoxide, ester, amine and carboxylic acid functions and carboxylate or sulfonate derivatives.

The composition according to the invention may also comprise additives normally used for the manufacture of polyimide or polyamide compositions. Thus, mention may be made of lubricants, flame retardants, plasticizers, nucleating agents, anti-UV agents, catalysts, antioxidants, antistatic agents, dyes, mattifying agents, molding aids or other conventional additives.

These fillers, impact modifiers and/or additives may be added to the (co)polyimide by suitable, usual means that are well known in the field of engineering plastics, such as, for example, during salification, after salification, during the solid-state polymerization, or as a melt mixture.

The polyimide compositions are generally obtained by blending the various compounds included in the composition without heating or in the melt. The process is performed at more or less high temperature and at more or less high shear force, according to the nature of the various compounds. The compounds can be introduced simultaneously or successively. Use is generally made of an extrusion device in which the material is heated, then melted and subjected to a shear force, and conveyed.

It is possible to blend all the compounds in the melt phase during a single operation, for example during an extrusion operation. It is possible, for example, to blend granules of the polymer materials, to introduce them into the extrusion device in order to melt them and to subject them to more or less high shearing. According to specific embodiments, it is possible to preblend some of the compounds, in the melt or not in the melt, before preparation of the final composition.

Applications

The (co)polyimide or the various compositions of the invention may be used for any shaping process for manufacture of plastics articles. More particularly, when high fluidity is desirable, such as in injection molding or melt extrusion, the (co)polyimide is imbalanced and/or comprises chain transfer agents.

The invention accordingly further relates to a process for producing plastics articles that employs the solid (co)polyimide (I) particles. To this end, mention may be made of various techniques such as the molding process, especially injection molding, extrusion, extrusion blow-molding, or alternatively rotary molding, especially in the field of motor vehicles or of electronics and electricity, for example. The extrusion process may especially be a spinning process or a process for manufacturing films.

The present invention relates, for example, to the manufacture of articles of impregnated fabric type or composite articles containing continuous fibers. These articles may be manufactured, in particular, by contacting a fabric and (co)polyimide particles of the invention in the solid or melt state. Fabrics are textile surfaces obtained by assembling yarns or fibers which are rendered integral by any process, especially such as adhesive bonding, felting, braiding, weaving or knitting. These fabrics are also referred to as fibrous or filamentous networks, for example based on glass fiber, carbon fiber or the like. Their structure may be random, unidirectional (1 D) or multidirectional (2D, 2.5D, 3D or other).

The (co)polyimide particles of the invention may in particular be used in processes for manufacturing articles by selective melting of polymer powder layers—in particular, rapid prototyping by sintering in solid phase using a laser. Manufacturing by selective fusion of layers is a method for manufacturing articles that comprises laying down layers of materials in powder form, selectively melting a portion or a region of a layer, and laying down a new layer of powder, and again melting a portion of this layer, and so on, so as to give the desired object. The selectivity of the portion of the layer to be melted is obtained by means, for example, of the use of absorbers, inhibitors, or masks, or via the input of focused energy, as for example electromagnetic radiation such as a laser beam. Preference is given in particular to sintering by addition of layers, especially to rapid prototyping by sintering using a laser.

A specific language is used in the description in order to aid comprehension of the principle of the invention. Nevertheless, it should be understood that no limitation on the scope of the invention is envisaged by the use of this specific language. Modifications, improvements and refinements can in particular be envisaged by a person conversant with the technical field concerned on the basis of his own general knowledge.

The term "and/or" includes the meanings and, or, all the other possible combinations of the elements connected to this term.

Other details or advantages of the invention will become more clearly apparent in the light of the examples given below purely by way of indication.

EXPERIMENTAL SECTION

Measurement Standards

The melting or fusion temperatures (Tf) and the temperature of crystallization on cooling (Tc) of the (co)polyimides are determined by differential scanning calorimetry (DSC), using a Perkin Elmer Pyris 1 instrument, at a rate of 10° C./min. The Tf and Tc values for the (co)polyimides are determined at the top of the melting and crystallization peaks. The glass transition temperature (Tg) is determined on the same instrument at a rate of 40° C./min (when possible, it is determined at 10° C./min and specified in the examples). The measurements are made after melting of the (co)polyimide formed at T>(Tf of the (co)polyimide+20° C.).

For the determination of the melting temperature of the salt, the end temperature of the endotherm measured by heating the salt at 10° C./min is considered.

Thermo-Gravimetric Analysis (TGA) is carried out on a sample of approximately 10 mg in a Perkin Elmer TGA7 instrument. The precise conditions of use (temperature, time, heating rate) are defined in the examples.

Thermogravimetric analysis makes it possible to determine the thermal stability of the polyimides, but it is used here also to calculate the yield of the reaction for conversion of the salt into polyimide in the following manner:

Heating at 10° C./min of a sample of salt polymerized by the process of the invention, from 30° C. to 300° C. Determination of the loss of mass observed, denoted y %.

Determination of the degree of reaction n by the calculation n=(1+x)/(1+y)−1, where x is the ratio of the molar mass of the "PI salt" in g/mol to the molar mass of one repeating PI unit. For example, for the PI 12PMA prepared from pyromellitic acid (PMA) and 1,12-diaminododecane, x=15.85%; for the PI 13PMA prepared from PMA and 1,13-diaminotridecane, x=15.38%.

The Fourier transform infrared (FTIR) analysis is performed on a Bruker Vector 22 instrument (in reflection, ATR Diamant) on the powder of formed polyimide.

$^1$H NMR analysis is carried out on a Bruker AV500 spectrometer in a 50/50 by volume $D_2O/CD_3OD$ mixture at ambient temperature for the salts, and in m-cresol at 110° C. in $D_2SO_4$ at 300 kelvins for the polyimides.

Particle size analysis is carried out dry on a SYMPATEC HELOS H1302 instrument with a dispersion pressure of 2 bar of nitrogen.

Colorimetric analysis CIE Va*b* is carried out on a Minolta CR-310 colorimeter.

Example 1: Preparation of a Polyimide PI 12PMA from a 12PMA Salt Synthesized in Pure Ethanol A 5 L reactor is charged with 40 g (0.15 mol) of 94.9% pyromellitic acid (Sigma-Aldrich) and 2 liters of pure ethanol. The reaction medium is stirred and heated to 70° C. while flushing gently with nitrogen. In a 1 L round-bottom flask, 30.5 g (0.15 mol) of 98% 1,12-diaminododecane (TCI Europe N.V.) are dissolved in 500 mL of pure ethanol at ambient temperature. This solution is then placed in a dropping funnel connected to the 5 L reactor and added dropwise over 1 hour to the ethanolic solution of pyromellitic acid. Contact between the diamine and the pyromellitic acid brings about the formation of a salt, which precipitates immediately under vigorous stirring. The reaction medium is maintained with vigorous stirring for 3 hours 30 minutes at 70° C. and under nitrogen.

The salt powder is recovered by filtration on a Büchner funnel, and is washed with ethanol, then ground and dried under vacuum overnight at 50° C. The mass yield is 95%. The powder is fine and white. The melting temperature of the salt is 260° C.

Polymerization

The 12PMA salt powder is placed in a fluted flask attached to a rotary evaporator, and placed under gentle flushing with nitrogen. The pressure is equal to atmospheric pressure. The flask is immersed in an oil bath at 200° C. and rotated for 8 hours. The PI 12PMA powder obtained is white and totally dry. The particles exhibit a median diameter D50 of 73 μm. TGA analysis is performed on the final product, by heating from 40° C. to 300° C. at 10° C./min. There is no detectable loss of mass apparent, which indicates that the 12PMA salt powder has undergone quantitative conversion into PI 12PMA powder.

FTIR analysis of the PI 12PMA powder shows the characteristic absorption bands of imide functions at 1699 and 1767 $cm^{-1}$, and the absence of absorption bands characteristic of amine functions is noted. $^1$H NMR analysis confirms the presence of imide functions formed, and the 1:1 stoichiometry of the units obtained from the diamines and tetracarboxylic acids, in other words the absence of monomer losses during the production of the PI 12PMA powder.

The PI 12PMA powder has a melting temperature of 303° C. (enthalpy of fusion ΔHf=35 J/g), a crystallization temperature of 274° C., and a Tg=101° C.

Extrusion

The PI 12PMA powder is extruded in rod form by placement of 10 g of the PI 12PMA thus prepared in a DSM MIDI 2000 twin-screw microextruder ("micro-compounder") (volume 15 $cm^3$) which has been preheated to 340° C. and has a screw speed of 100 revolutions per minute.

The microextruder possesses a recirculation channel which allows the residence time in the twin screw to be adjusted. We selected a residence time of 1 minute: the torque exerted on the rotary screw motor is stable, a sign of little change in the melt medium. After a residence time of 1 minute, the melted polyimide is extruded in the form of a rod and cooled in a water tank, then pelletized. The thermal properties of the polyimide are Tf=305° C., and Tc=287° C.

Comparative Example 1: Polymerization of the PI 12PMA Salt at a Melting Temperature Greater than Tf Salt The PI 12PMA salt of example 1 is polymerized beyond the melting temperature of the salt: it is heated under nitrogen from ambient temperature to 300° C. at a heating rate of 10° C./min and is maintained at 300° C. for 1 minute, then cooled immediately at ambient temperature.

Thermal analysis of the resulting polyimide shows that the melting temperature is 290° C. and the crystallization temperature is 266° C. It appears that this method of polymerization, relative to the polymerization of the invention as described in example 1, produces a decrease in the melting (−13° C.) and crystallization (−8° C.) temperatures of the polyimide: the two polyimides, although of similar chemical structure, exhibit a different macromolecular architecture.

Example 2: Preparation of a PI 12PMA Polyimide from a 12PMA Salt Synthesized in a Water/Ethanol Mixture A 350 mL three-neck round-bottom flask is charged with 2.684 g (0.009 mol) of 84.1% pyromellitic acid (the impurities being water) and 150 mL of a 50/50 by volume water/ethanol mixture. The reaction medium is stirred and heated to 80° C. under gentle nitrogen flushing: the pyromellitic acid is dissolved in this way. In a 100 mL round-bottom flask, 1.83 g (0.009 mol) of 98% 1,12-diaminododecane are dissolved in 50 mL of a 50/50 by volume water/ethanol mixture at ambient temperature. This solution is then placed in a dropping funnel connected to the 350 mL reactor and is added dropwise over 1 hour to the ethanolic solution of pyromellitic acid. This time, no precipitate is formed on contact between the diamine and the pyromellitic acid: the salt formed dissolves immediately. The reaction medium is held with stirring at 80° C. for 3 hours under nitrogen.

Then 100 mL of the water/ethanol mixture are evaporated by heating at atmospheric pressure to 130° C., after which the reaction medium is brought to ambient temperature. The reactor is subsequently immersed in water at 5° C. to cause the salt to crystallize. The salt is recovered by filtration on a Büchner funnel, ground and washed with ethanol, then dried under vacuum at 50° C. overnight. The mass yield is 94%. The product takes the form of a fine white powder.

Polymerization

The 12PMA salt powder is polymerized by heating at 200° C. to give a PI 12PMA powder. DSC analysis of the polyimide thus formed shows that the melting temperature Tf is 308° C., and the crystallization temperature Tc is 273° C. It appears that the melting temperature is slightly greater than that of the PI 12PMA made from a salt in pure ethanol.

It can be seen that when the 12PMA salt is made in solution in a water/ethanol mixture, in other words in a medium in which it is soluble, this influences the eventual thermal properties of the polyimide made in this way.

Example 3: Preparation of a Polyimide PI 13PMA from a Salt 13PMA Synthesized in Pure Ethanol 1,13-Diaminotridecane is synthesized from a nitrilation of a 99% 1,13-tridecanedicarboxylic acid (Zibo Guangtong Chem), followed by a hydrogenation. The purity of the C13 diamine is 93%.

40 g (0.15 mol) of 94.9% pyromellitic acid and 2 liters of pure ethanol are placed in a 5 L reactor. The reaction medium is stirred and heated to 70° C. while flushing gently with nitrogen. 34.5 g (0.15 mol) of 93% 1,13-diaminotridecane are dissolved in 500 mL of pure ethanol at ambient temperature in a 1 L round-bottomed flask. This solution is then placed in a dropping funnel connected to the 5 L reactor and added dropwise over 1 hour to the ethanolic solution of pyromellitic acid. The contact between the diamine and the pyromellitic acid gives rise to the formation of a salt which precipitates out immediately with stirring. The reaction medium is held with vigorous stirring for 3 hours 30 minutes at 70° C. under nitrogen.

The salt powder is recovered by filtration through a Büchner funnel and washed with ethanol, ground and then dried under vacuum at 50° C. overnight. The mass yield is 85%, owing to losses during emptying of the reactor. The powder is fine and white. The melting temperature of the salt is 230° C.

Polymerization

The 13PMA salt powder is placed in a fluted flask attached to a rotary evaporator and placed under a gentle flush of nitrogen. The pressure is equal to atmospheric pressure. The flask is immersed in an oil bath at 200° C. and rotated for 8 hours. The PI 13PMA powder obtained is white and totally dry. The particles exhibit a median diameter D50 of 179 μm. TGA analysis is performed on the final product, by heating from 40° C. to 300° C. at 10° C./min. No detectable loss of mass appears, indicating that the 13PMA salt powder has been quantitatively converted into PI 13PMA powder.

FTIR analysis of the PI 13PMA powder shows the characteristic absorption bands of imide functions at 1700 and 1767 cm$^{-1}$, and the absence of absorption bands characteristic of amine functions is noted.

The PI 13PMA powder has a melting temperature of 271° C. (ΔHf=36 J/g), a crystallization temperature of 238° C., and a Tg=93° C.

Extrusion

The PI 13PMA powder is extruded in rod form by placement of 10 g of the PI 13PMA thus prepared in a DSM MIDI 2000 twin-screw microextruder ("micro-compounder") (volume 15 cm$^3$) which has been preheated to 300° C. and has a screw speed of 100 revolutions per minute.

The melting temperature of the PI 13PMA rod extruded from powder is 270° C., i.e., identical to the melting point of the PI 13PMA powder before extrusion. It will be noted that extrusion is easier to carry out with the PI 13PMA than with the PI 12PMA, which must be employed at a higher temperature.

Injection

The PI 13PMA powder is injected by means of an injection micropress combined with the "micro-compounder", by melting of the PI 13PMA at 300° C. and injection in a mold regulated at 200° C., to form bars with dimensions of 80×12×2 mm$^3$. The bars are rigid but have a certain amount of flexibility.

Example 4: Preparation of Copolyimides PI 10PMA/12PMA of 100/0, 75/25, 50/50, 25/75 and 0/100 Mol/Mol by Synthesis of Co-Salts Using a procedure like that of example 1, this time an ethanolic solution of pyromellitic acid is added dropwise to a stoichiometric amount of a mixture of 1,10-diaminodecane (C10 diamine) and 1,12-diaminododecane (C12 diamine) in solution in pure ethanol. The molar ratio of the two diamines, C10/C12, that is selected is 100/0 (example 4A), 75/25 (example 4B), 50/50 (example 4C), 25/75 (example 4D), and 0/100 (example 4E). The salts formed precipitate immediately and are recovered by evaporation of the solvent, then dried overnight under vacuum at 50° C. A PI powder formed is produced by heat treatment at 200° C. of the salt powder, then analyzed by DSC. The primary observation is that all of the copolyimides are semicrystalline.

It is also observed, in table 1 below, that the copolyimides exhibit a single melting temperature, which means that they are copolymers capable of cocrystallization. This melting temperature may be between the Tf values of the two homopolyimides or even lower. It also appears that the heat of fusion is lower than the heat of fusion of the homopolymers but that it remains high irrespective of the molar composition of the diamines.

TABLE 1

| PI 10PMA/12PMA | Tf Salt ° C. | TfPI ° C. | ΔHfPI J/g | TcPI ° C. | TgPI* ° C. |
|---|---|---|---|---|---|
| 4A | 245 | 334 | 47 | 306 | 115 |
| 4B | 242 | 294 | 19 | 274 | 109 |
| 4C | 237 | 269 | 26 | 255 | 104 |
| 4D | 238 | 285 | 30 | 261 | 100 |
| 4E | 260 | 303 | 35 | 274 | 96 |

*The Tg is determined at 10° C./min

Example 5: Preparation of Low-Viscosity PI 12PMA Polyimide by Stoichiometric Imbalance from a 12PMA Salt Synthesized in Pure Ethanol In order to obtain polyimides prepared from polyimide salt having a lower viscosity, an excess of one of the two monomers was introduced.

Example 5A: a 2 L reactor is charged with 17.538 g (0.0674 mol) of 97.6% pyromellitic acid and 600 g of pure ethanol. The reaction medium is stirred with gentle flushing with nitrogen. In a 500 mL round-bottom flask, 13.373 g (0.066 mol) of 98.9% 1,12-diaminododecane (TCI Europe N.V.) are dissolved in 260 g of pure ethanol at 60° C. This solution is then placed in a dropping funnel connected to the 2 L reactor, and is added dropwise over 30 minutes to the ethanolic solution of pyromellitic acid. Contact between the diamine, the monoamine, and the pyromellitic acid brings about the formation of a salt, which precipitates immediately under vigorous stirring. The reaction medium is heated to 70° C. and kept with vigorous stirring for 2 hours 30 minutes under nitrogen. The salt powder is recovered by evaporation of the ethanol, then ground and dried under vacuum at 45° C. overnight. The mass yield is 99.1%. The powder is fine and white. The stoichiometric ratio R=[pyromellitic acid]/[diamine] is 1.02.

The salt powder is placed in a fluted round-bottom flask attached to a rotary evaporator, and is placed under gentle flushing with nitrogen. The pressure is equal to atmospheric pressure. The flask is immersed in an oil bath at 200° C. and rotated for 5 hours. The PI 12PMA powder obtained is white and completely dry.

The resulting polyimide powder is analyzed by measurement of the relative solution viscosity in 96% sulfuric acid of a 10 g/L polyimide solution in an Ubbelohde tube with a diameter of 1.03 mm in combination with a SHOTT viscosimeter having the reference AVS350 and at a temperature of 25° C. The relative viscosity is 2.06.

Examples 5B, 5C and 5D are carried out using the same method as for example 5A, but by changing the stoichiometric ratio R—equal to 1.04, 1.08, and 1.12, respectively. In all of these examples, there is more pyromellitic acid than diamine. For comparison, an example 5E is carried out with a ratio R of 0.93, in other words a case where there is less pyromellitic acid than diamine.

Table 2 reports the viscosities of the resulting polyimides. It is apparent that when there is more diamine, the resulting polyimide is insoluble, a sign of branching or of substantial crosslinking. When there is more pyromellitic acid, the resulting polyimide is highly soluble and the viscosity in solution decreases in line with the size of the ratio R. This route for stoichiometric imbalance of salts allows the viscosity of the polyimides obtained by the salt route to be modified.

TABLE 2

| Examples | R | Viscosity in solution |
|---|---|---|
| 5A | 1.02 | 2.06 |
| 5B | 1.04 | 1.56 |
| 5C | 1.08 | 1.49 |
| 5D | 1.12 | 1.45 |
| 5E | 0.93 | Insoluble |

The number-average molar mass of samples 5A and 5D is determined by $^1$H NMR in $D_2SO_4$ as solvent at 300 kelvins.

The samples exhibit no amine ends, as expected, because of the stoichiometric imbalance selected in favor of the acid functions. The number-average molar mass can therefore be calculated using the following equation: $Mn=DPn \times M°$ where $M°=(Mdiamine+MPMA-18 \times 4)/2=191$ g/mol and $DPn=(Ndiamine+NPMA)/(Nchain\ end)/2$, i.e., Mn=13 800 g/mol for example 5A and Mn=5600 g/mol for example 5D.

Example 6: Preparation of Low-Viscosity PI 12PMA Polyimide by Use of Chain Transfer Agent from a 12PMA Salt Synthesized in Pure Ethanol In order to prepare polyimides prepared from polyimide salt having a lower viscosity, a chain transfer agent, 1-aminododecane, was introduced.

Example 6A: a 2 L reactor is charged with 17.07 g (0.0655 mol) of 97.6% pyromellitic acid and 550 g of pure ethanol. The reaction medium is stirred with gentle flushing with nitrogen. In a 500 mL round-bottom flask, 13.15 g (0.0649 mol) of 98.9% 1,12-diaminododecane (TCI Europe N.V.) and 0.2530 g (0.00137 mol) of 98% 1-aminododecane are dissolved in 200 g of pure ethanol at 60° C. This solution is then placed in a dropping funnel connected to the 2 L reactor, and is added dropwise over 1 hour to the ethanolic solution of pyromellitic acid. Contact between the diamine, the monoamine, and the pyromellitic acid brings about the formation of a salt, which precipitates immediately under vigorous stirring. The reaction medium is heated to 70° C. and kept with vigorous stirring for 2 hours 30 minutes under nitrogen. The salt powder is recovered by filtration on a Büchner funnel and washed with ethanol, then ground and dried under vacuum at 45° C. overnight. The mass yield is 98.8%. The powder is fine and white. NMR analysis of the salt indicates the presence of 1.8 mol % of 1-aminododecane, relative to the mixture of 1-aminododecane and 1,12-diaminododecane.

The salt powder is placed in a fluted round-bottom flask attached to a rotary evaporator, and is placed under gentle flushing with nitrogen. The pressure is equal to atmospheric pressure. The flask is immersed in an oil bath at 200° C. and rotated for 5 hours. The PI 12PMA powder obtained is white and completely dry.

The resulting polyimide powder is analyzed by measurement of the relative solution viscosity in 96% sulfuric acid of a 10 g/L polyimide solution in an Ubbelohde tube with a diameter of 1.03 mm in combination with a SHOTT viscosimeter having the reference AVS350 and at a temperature of 25° C. The relative viscosity is 4.9.

Example 6B: the same protocol is used, but using 1.6725 g (0.00642 mol) of 97.6% pyromellitic acid in solution in 60 g of ethanol, and a mixture of 1.2475 g (0.00616 mol) of 98.9% 1,12-diaminododecane and 0.1023 g (0.00054 mol) of 98% 1-aminododecane. The polyimide obtained has a relative viscosity of 2.61.

The color of the PI 12PMA powder from example 6B is analyzed. The powder has the colorimetric characteristics CIE V=98.17, a*=0.20, b*=2.66, thereby indicating that the powder is very white. A powder is considered here to be white when b*≤10 and slightly yellow when b*>10. The polymerization process of the invention therefore prevents instances of coloring. Without wishing to be tied to any one theory, this may be due either to degradations, or to the presence of residual solvents, as is the case in the polymerizations of polyimides by a melt route, above the melting temperature of the polyimide, or by a solvent route.

The polyimide 6B is injected by means of an injection micropress combined with the "micro-compounder", by melting of the PI 12PMA at 320° C. and injection in a mold regulated at 180° C., to form bars with dimensions of 80×12×2 mm³. The bars are rigid but have a certain amount of flexibility. A dynamic mechanical analysis in three-point bending (imposed strain of 0.01%, frequency 1 Hz) is carried out on a TA Instrument RSA3 apparatus. At 23° C., the E' modulus is 2.2 GPa.

Example 6C: the same protocol is used, but using 28.1459 g (0.10809 mol) of 97.6% pyromellitic acid in solution in 535 g of ethanol, and a mixture of 21.3347 g (0.10531 mol) of 98.9% 1,12-diaminododecane and 1.0556 g (0.00558 mol) of 98% 1-aminododecane. This time, the salt precipitate is recovered by evaporation of the ethanol under reduced pressure, and then ground. The polyimide obtained has a relative viscosity of 1.76.

1 g of the polyimide from example 6C is placed in a test tube and inertized with nitrogen. The tube is placed in a block heated to 320° C. (above the melting temperature of the polyimide) for 40 minutes. After 40 minutes, the relative viscosity is determined at 1.66, which shows that the viscosity of the polyimide has changed by only 6% during its passage to the melt state over 40 minutes. The first conclusion is that the viscosity has not increased, meaning that the synthesis process allows sufficient and controlled molar masses to be obtained, and the second conclusion is that the PI 12PMA blocked with 1-aminododecane hence exhibits a high thermal stability.

Example 7: Preparation of PI 12PMA/Carbon Fabric Composite

A batch of 200 g of PI 12PMA polyimide powder blocked with 12-aminododecane, with a relative viscosity of 1.7, is used to make a thermoplastic PI 12PMA/carbon fabric composite. The polyimide used was synthesized by the processes described above in example 6C.

Prior to use, the powder is dried at 90° C. under vacuum overnight.

The reinforcement used in this example is in the form of preforms made of carbon fabrics, cut to the dimensions required for the manufacture of plaques, namely 100×150 mm. The reinforcing fabric used is a balanced fabric made of carbon fiber (0°-90°) originating from Hexcel, having a grammage of 200 g/m² (3K).

The composite components are produced by means of a force-controlled two-plate 100 tonne hydraulic press equipped with an induction heating mold (RocTool® technology) and with cooling means (water circulation). The metal mold has a cavity with dimensions 150 mm×150 mm.

To produce a composite containing 55% by volume of carbon fibers with the fabrics having a grammage of 200 g/m² (3K), a preform is prepared by stacking carbon layers, each layer being given a relatively uniform dusting of the polyimide powder. In the example under consideration, 10 layers of carbon (200 g/m²) were used. The preform, consisting of the stack of dusted layers, is then introduced into the mold.

Following introduction of the preform and closing of the mold, under very low pressure, the temperature of the press plateaus is then raised to 320° C. in 80 seconds. A plateau is performed under very low pressure for 60 seconds at 320° C. At the end of the plateau (60 seconds) a pressure is applied for 20 seconds: 25 bar jack. Cooling is carried out under pressure over 6 minutes and 30 seconds: the plaques are demolded at approximately 50° C. The total cycle time is less than 10 minutes.

The plaques obtained have a thickness of 2.12 mm. The composite articles of the invention exhibit a very good surface appearance.

It is therefore possible to obtain composite articles by using the polyimides of the invention, in particular with extremely short manufacturing cycles being operated.

The invention claimed is:

1. A process for producing solid particles of semicrystalline and semiaromatic (co)polyimide, having a median diameter D50 of between 0.01 and 2 mm, said polyimide being thermoplastic and having a melting temperature of between 50 and 350° C., the process comprising:
   (a) charging a reactor with a salt formed by reaction of at least one diamine, in which each of the amine functional groups is bound to a respective aliphatic carbon atom, with at least one aromatic tetracarboxylic acid;
   (b) polymerizing the salt from step (a) in the solid state to give the (co)polyimide, at an absolute pressure of between 0.005 and 1 MPa and at a temperature T which obeys the following relation:

Tf of the salt from step (a)>T>Tg of the (co)polyimide to be obtained; and (c) recovering the solid (co)polyimide particles.

2. The process as claimed in claim 1, wherein the (co)polyimide has a glass transition temperature Tg of less than or equal to 200° C.

3. The process as claimed in claim 1, wherein the at least one aromatic tetracarboxylic acid is selected from the group consisting of pyromellitic acid, 3,3',4,4'-biphenyltetracarboxylic acid, 2,3,3',4'biphenyltetracarboxylic acid, 2,2',3,3'-biphenyltetracarboxylic acid, 3,3',4,4'benzophenonetetracarboxylic acid, 2,2',3,3'-benzophenonetetracarboxylic acid, 1,2,5,6-naphthalenetetracarboxylic acid, 2,3,6,7-naphthalenetetracarboxylic acid, 2,3,5,6-pyridinetetracarboxylic acid, 3,4,9,10-perylenetetracarboxylic acid, 3,3',4,4'tetraphenylsilanetetracarboxylic acid, and 2,2'-bis(3,4-bicarboxyphenyl)hexafluoropropanetetracarboxylic acid.

4. The process as claimed in claim 1, wherein the at least one diamine is selected from molecules of formula NH$_2$—R—NH$_2$ with a divalent alkylaromatic or cycloaliphatic, or linear or branched, saturated and/or unsaturated aliphatic hydrocarbon radical R, optionally comprising one or more heteroatoms.

5. The process as claimed in claim 4, wherein the radical R comprises from 2 to 50 carbon atoms, and optionally one or more heteroatoms.

6. The process as claimed in claim 1, wherein the at least one diamine is selected from the group consisting of 1,2-diaminoethane, 1,3-diaminopropane, 1,4-diaminobutane, 1,5-diaminopentane, 2-methyl-1,5-diaminopentane, hexamethylenediamine, 3-methylhexamethylenediamine, 2,5-dimethylhexamethylenediamine, 2,2,4- and 2,4,4-trimethylhexamethylenediamine, 1,7-diaminoheptane, 1,8-diaminooctane, 2,2,7,7-tetramethyloctamethylenediamine, 1,9-diaminononane, 5-methyl-1,9-diaminononane, 1,10-diaminodecane, 1,11-diaminoundecane, 1,12-diaminododecane, 1,13-diaminotridecane, and 1,14-diaminotetradecane.

7. The process as claimed in claim 1, wherein the at least one diamine is selected from the group consisting of isophoronediamine, 1,3-diaminocyclohexane, 1,4-diaminocyclohexane, and diaminodicyclohexylmethane.

8. The process as claimed in claim 1, wherein the at least one diamine is selected from molecules of formula NH$_2$(CH$_2$)$_n$-Ph-(CH$_2$)$_{n'}$—NH$_2$ where n and n' are nonzero integers which are independent of one and Ph is a phenyl group.

9. The process as claimed in claim 1, wherein the salt is admixed with an excess of one of the monomers so as to create a stoichiometric imbalance.

10. The process as claimed in claim 1, wherein the absolute pressure during step (b) is between 0.005 MPa and 0.2 MPa.

11. The process as claimed in claim 1, wherein the temperature during step (b) is between 50° C. and 250° C.

12. The process as claimed in claim 1, wherein the number-average molar mass Mn of the (co)polyimide is between 500 g/mol and 50,000 g/mol.

13. Solid particles of (co)polyimide (I), obtained by the process as claimed in claim 1.

14. Solid particles of semicrystalline and semiaromatic (co)polyimide, having a median diameter D50 of between 0.01 and 2 mm, said polyimide being thermoplastic and having a melting temperature of between 50 and 350° C., said (co)polyimide being obtained from the polymerization of a salt formed by reacting at least one diamine in which each of the amine functional groups is bound to a respective aliphatic carbon atom with at least one aromatic tetracarboxylic acid.

15. A process for producing a composition, the process comprising melt or nonmelt mixing of the solid particles of (co)polyimides (I) as claimed in claim 14 with reinforcing or bulking fillers and/or with impact modifiers and/or with additives.

16. A plastics article, wherein the article comprises the solid particles of (co)polyimide (I) as claimed in claim 14.

17. The solid particles of claim 14, wherein the solid particles exhibit less than or equal to a 10% change in relative viscosity after 10 minutes in the melt state, measured with a viscosimeter as a 10 g/L sample in 96% sulfuric acid at a temperature of 25° C.

18. The solid particles of claim 14, wherein the solid particles exhibit less than or equal to a 10% change in number-average molar mass after 10 minutes in the melt state, determined by $^1$H NMR in D$_2$SO$_4$ at 300 K.

19. The process as claimed in claim 1, wherein the salt formed by reaction of at least one diamine with at least one aromatic tetracarboxylic acid has the general structure shown below:

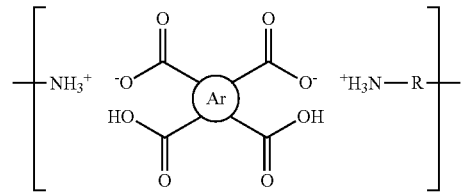

wherein Ar represents the aromatic group from the aromatic tetracarboxylic acid used in the salt forming reaction and R is dependent on the at least one diamine used in the salt forming reaction.

20. The process as claimed in claim 1, wherein the salt is formed in a reaction medium comprising a water and alcohol mixture.

21. The process as claimed in claim 1, wherein the salt is admixed with at least one chain transfer agent.

22. The process as claimed in claim 1, further comprising:
    reacting at least one diamine, in which each of the amine functional groups is bound to a respective aliphatic carbon atom, with at least one aromatic tetracarboxylic acid to produce the salt; and
    collecting the produced salt.

* * * * *